United States Patent
Yochai et al.

(10) Patent No.: US 9,104,325 B2
(45) Date of Patent: Aug. 11, 2015

(54) MANAGING READ OPERATIONS, WRITE OPERATIONS AND EXTENT CHANGE OPERATIONS

(71) Applicants: Yechiel Yochai, Moshav Aviel (IL); Joseph Ezra, Even Yehuda (IL); Ido Ben-Tsion, Ness-Ziona (IL); Efraim Zeidner, Haifa (IL)

(72) Inventors: Yechiel Yochai, Moshav Aviel (IL); Joseph Ezra, Even Yehuda (IL); Ido Ben-Tsion, Ness-Ziona (IL); Efraim Zeidner, Haifa (IL)

(73) Assignee: INFINIDAT LTD., Herzliya (IL)

( * ) Notice: Subject to any disclaimer, the term of this patent is extended or adjusted under 35 U.S.C. 154(b) by 91 days.

(21) Appl. No.: 14/078,558

(22) Filed: Nov. 13, 2013

(65) Prior Publication Data

US 2015/0134909 A1    May 14, 2015

(51) Int. Cl.
*G06F 3/00* (2006.01)
*G06F 3/06* (2006.01)
*G06F 17/30* (2006.01)

(52) U.S. Cl.
CPC ............ *G06F 3/0638* (2013.01); *G06F 3/0626* (2013.01); *G06F 3/0683* (2013.01); *G06F 3/0611* (2013.01); *G06F 17/3033* (2013.01)

(58) Field of Classification Search
CPC ........................... G06F 17/3033; G06F 3/0611
See application file for complete search history.

(56) References Cited

U.S. PATENT DOCUMENTS

2015/0095346 A1*    4/2015    Kimmel et al. ............... 707/747

* cited by examiner

*Primary Examiner* — Zachary K Huson
(74) *Attorney, Agent, or Firm* — Reches Patents (57) ABSTRACT

A method for responding to an extent change operation, the method may include receiving, by a storage system and from a requesting entity, a request to perform an extent content change operation that involves changing a content of a certain extent within a logical space supported by a storage system; generating, in response to the request, extent change operation information that comprises (a) an event counter indicative of a time of requested occurrence of the extent change operation, (ii) a type of extent change operation indicator, and (ii) logical addresses associated with the extent change operation; and sending to the requesting entity an acknowledgement indicative of a completion of the extent change operation before a completion of the extent change operation if an expected content of the certain extent is known before completion of the extent change operation.

25 Claims, 5 Drawing Sheets

---

Receiving, by a storage system and from a requesting entity, a request to perform an extent content change operation that involves changing a content of a certain extent within a logical space supported by a storage system. 410

Generating, in response to the request, extent change operation information that comprises (a) an event counter indicative of a time of requested occurrence of the extent change operation, (ii) a type of extent change operation indicator, and (ii) logical addresses associated with the extent change operation. 420

Sending to the requesting entity an acknowledgement indicative of a completion of the extent change operation before a completion of the extent change operation if an expected content of the certain extent is known before completion of the extent change operation. 430

MANAGING READ OPERATIONS, WRITE OPERATIONS AND EXTENT CHANGE OPERATIONS

BACKGROUND

A storage system maintains a logical to physical mapping data structure for mapping logical addresses to physical addresses. The mapping can be done in various manners. For example, the mapping can map logical addresses (LAs) within a volume (e.g., LBA—Logical Block Addresses or any other kind of upper layer addresses known to an application or other accessing entity that accesses the volume) to physical addresses within a storage device (or any other kind of lower layer addresses, e.g. addresses within a lower abstraction layer). An atomic unit of a logical memory space used for data handling and organization within the system can be a data unit identified by a logical address and having a fixed predefined size. Multiple successive logical addresses can form an extent, a logical volume and the like. Storage systems may support a variety of input/output (IO) commands. Some IO commands may refer to one or more data units and some may refer to extents and to logical volumes. An extent usually includes one or more contiguous logical addresses.

Several operations related to changes of extents such as data copying and data deletion can be time consuming, especially when large extents are involved. Such operations may include:
  a. Unmap—this operation is performed when data is deleted and its allocated physical space should be freed.
  b. Extent copy—this operation is performed when data is to be copied from a source logical address to a target logical address.

During the processing of these operations, access to the affected address ranges (included in the extent to be deleted or to the target extent to be overwritten by the source extent) should be blocked or postponed until the changes are done. When large amount of data is involved, blocking access to the affected extents addresses can cause significant latency experienced by read requests.

SUMMARY

According to an embodiment of the invention there may be provided a method for responding to an extent change operation, the method may include receiving, by a storage system and from a requesting entity, a request to perform an extent content change operation that involves changing a content of a certain extent within a logical space supported by a storage system; generating, in response to the request, extent change operation information that may include (a) an event counter indicative of a time of requested occurrence of the extent change operation, (ii) a type of extent change operation indicator, and (ii) logical addresses associated with the extent change operation; and sending to the requesting entity an acknowledgement indicative of a completion of the extent change operation before a completion of the extent change operation if an expected content of the certain extent is known before completion of the extent change operation.

According to an embodiment of the invention there may be provided a non-transitory computer readable medium that stores instructions that one executed by a computer cause the computer to execute at least the stages of: receiving, by a storage system and from a requesting entity, a request to perform an extent content change operation that involves changing a content of a certain extent within a logical space supported by a storage system; generating, in response to the request, extent change operation information that may include (a) an event counter indicative of a time of requested occurrence of the extent change operation, (ii) a type of extent change operation indicator, and (ii) logical addresses associated with the extent change operation; and sending to the requesting entity an acknowledgement indicative of a completion of the extent change operation before a completion of the extent change operation if an expected content of the certain extent is known before completion of the extent change operation.

The non-transitory medium may include instructions for completing the exchange operation as a background process.

The non-transitory medium may include instructions for sending the acknowledgement immediately after generating the extent change operation information.

According to an embodiment of the invention there may be provided a storage system that may include a permanent storage layer and a storage control and cache unit, the storage control and cache unit is arranged to receive, from a requesting entity, a request to perform an extent content change operation that involves changing a content of a certain extent within a logical space supported by a storage system; to generate, in response to the request, extent change operation information that may include (a) an event counter indicative of a time of requested occurrence of the extent change operation, (ii) a type of extent change operation indicator, and (ii) logical addresses associated with the extent change operation; and send to the requesting entity an acknowledgement indicative of a completion of the extent change operation before a completion of the extent change operation if an expected content of the certain extent is known before completion of the extent change operation.

The storage system may be arranged to complete the exchange operation as a background process.

The storage system may be arranged to send the acknowledgement immediately after generating the extent change operation information.

According to an embodiment of the invention there may be provided a method for accessing data units in a storage system, the method may include: receiving by a storage system, at an access request point of time, an access request for accessing a requested data unit having a requested logical address; determining, by the storage system, whether to respond to the access request by providing either one of: (a) a currently stored content of the requested data unit; and (b) an expected content of the requested data unit at a completion of an extent change operation that is not completed at the access request point of time, wherein the extent change operation involves changing a content of a certain extent that may include the requested data unit; providing the expected content if it is determined to provide the expected content; and providing the currently stored content if it is determined to provide the currently stored content.

The method may include determining to provide the expected content if a last extent change operation associated with the requested data unit was requested to be executed at a point of time that exceeded writing the requested data unit to the storage system.

The access request may be a read request.

The method may include completing the extent change operation.

The method may include providing the expected content regardless of a completion of the extent change operation.

The extent change operation may be an Unmap operation and wherein the providing of the expected content may include providing default content indicative of a deleted content.

The extent change operation may be a copy operation for copying a content of a source extent to the certain extent.

The source extent may be a read only extent and the method may include re-directing the access request from the requested logical address to a logical address in the source extent.

The method may include updating a logical to physical address data structure that includes mapping of the certain extent to map between logical addresses of the certain extent to physical addresses that store the source extent.

The method may include creating a certain snapshot of the source extent in proximity to the read request point of time.

The providing of the expected content may include providing a content of a data unit of the certain snapshot that corresponds to the requested data unit.

The providing of the expected content may include re-directing the access request from the requested logical address to a logical address in the certain snapshot.

The method may include updating a logical to physical address data structure that includes mapping of the certain extent to map between logical addresses of the certain extent to physical addresses that facilitate a retrieval of the certain snapshot.

The method may include maintaining, per each logical space entity that is supported by the storage system, extent change operations information that may include for each extent change operation that is associated with at least one logical address of the logical space entity, (a) an event counter indicative of a time of requested occurrence of the extent change operation, (ii) a type of extent change operation indicator, and (ii) logical addresses associated with the extent change operation.

The method wherein the extent change operation information further may include information about a manner for responding to a read request for data units having logical addresses associated with the extent change operation.

The method may include maintaining for each data unit currently stored by the storage system a data unit write tag indicative of a value of the event counter when the data unit was written to the storage system.

The method wherein the determining may include determining to provide the expected content if a value of a data unit write tag of the requested data unit and an event counter associated with a last extent change operation associated with the requested data unit indicate that the last extent change operation associated with the requested data unit was requested to be executed at a point of time that exceeded writing the requested data unit to the storage system.

The method wherein the determining may include determining to provide the currently stored content if a value of a data unit write tag of the requested data unit and an event counter associated with a last extent change operation associated with the requested data unit indicate that the last extent change operation associated with the requested data unit was requested to be executed at a point of time that preceded writing the requested data unit to the storage system.

The method may include maintaining a logical to physical mapping data structure that includes mapping information about data units written to the storage system, wherein the logical to physical mapping is calculated regardless of any extent change operation; wherein the providing of the currently stored content may include utilizing the logical to physical mapping data structure.

The logical space entity may be a volume, more than a single volume or a part of a volume.

According to an embodiment of the invention there may be provided a non-transitory computer readable medium that stores instructions that one executed by a computer cause the computer to execute at least the stages of: receiving by a storage system, at a read request point of time, a read request for reading a requested data unit having a requested logical address; determining, by the storage system, whether to respond to the read request by providing either one of: (a) a currently stored content of the requested data unit; and (b) an expected content of the requested data unit at a completion of an extent change operation that is not completed at the read request point of time, wherein the extent change operation involves changing a content of a certain extent that may include the requested data unit; providing the expected content if it is determined to provide the expected content; and providing the currently stored content if it is determined to provide the currently stored content.

According to an embodiment of the invention there may be provided a storage system that may include a permanent storage layer and a storage control and cache unit, the storage control and cache unit is arranged to receive at a read request point of time, a read request for reading a requested data unit having a requested logical address; determine whether to respond to the read request by providing either one of: (a) a currently stored content of the requested data unit; and (b) an expected content of the requested data unit at a completion of an extent change operation that is not completed at the read request point of time, wherein the extent change operation involves changing a content of a certain extent that may include the requested data unit; provide the expected content if it is determined to provide the expected content; and provide the currently stored content if it is determined to provide the currently stored content.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In order to understand the invention and to see how it may be carried out in practice, embodiments will now be described, by way of non-limiting example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "calculating", "computing", "determining", "generating", "setting", "configuring", "selecting", "defining", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

An extent change operation is an operation that involves changing a content of an extent.

In the following text there are multiple references to read operations. Read operations are provided as an example to access operations. Access operations may also include, for example, copy operations.

An extent change operation that is not completed may be an extent change operations that was not started or an extent change operation that started but was not completed. According to embodiments of the invention, some operations that affect data in requested address ranges (such as extents) and denoted hereinafter 'extent change operations', can be performed as background processes, can be executed in a low priority comparing to other storage system operations (such as responding to IO commands) and even not executed at all.

Read requests relating to extents associated with extent change operations under process can be executed without waiting to a completion of the extent change operations—thus dramatically reducing the response period.

A logical space entity is an addressable container that includes a collection of contiguous logical addresses that can be mapped to one or more storage devices (e.g. disks). The logical space entity may be a logical volume, a partition within a logical volume or any portion of the logical address space of the system and is defined as an entity addressable by I/O protocols and applications coupled to the storage system.

For simplicity of explanation it is assumed that extent change operation data structures are allocated per each logical volume and that a single logical to physical mapping data structure is provided per each logical volume. The extent change data structure and the mapping data structure can be allocated for other logical space units and even for the entire logical space supported by the storage system.

Read requests directed to one or more logical addresses of an extent associated with an uncompleted extent change operation can be served immediately (without waiting to a completion of the extent change operation) and are not being blocked, even while the extent change operations are being processed or not even started. The response to the read-request directed to one or more logical addresses of an extent that is associated with an uncompleted extent change operation utilizes values expected to be read from the extent after the completion of the extent change operation.

The extent change operations may include extent un-map (delete the data of the extent), extent copy, or any other operation that may affect (or already affects) an extent in a way that the final value of the extent (expected value of the extent at the end of the execution of the extent change operation) is known prior to the completion (and even prior to the start) of performing the extent change operation, e.g., the final value may be a predefined value (e.g. zero) or a value that is already stored elsewhere in the storage system and the read request can be directed to the alternate storage location. Since the expected value of the extent is known or can be determined before starting or completing the extent change operation, this expected value can be returned in response to a read request even if the extent change operation is not yet completed or not even started.

It is noted that the un-map operation requires searching in a logical to physical mapping data structure all the entries corresponding to logical addresses included in the address range requested to be unmapped and removing the references to physical storage space (physical addresses) from the logical to physical mapping data structure (e.g., overriding the references with NULL values) or removing the entire entry, or performing any other known in the art technique for marking addresses as free. Generally, in response to a request to read data from logical addresses that are unmapped or not yet assigned, a certain constant value (default) is returned indicative of erased content, e.g. all-zeros.

A request to perform an extent change operation should affect data units once received.

An event counter is created for indicating a time of reception of the extent change operation and it is assumed (for simplicity of explanation) that the event counter is indicative of a time of receiving the request to perform the extent change operation.

According to an embodiment of the invention a single event counter can be allocated per multiple logical space entities and even for the entire logical space. According to another embodiment of the invention a single event counter can be allocated for a single logical space entity. For example—an event counter can be allocated per volume. In the following examples it is assumed that a logical counter is allocated per volume.

Accordingly—event information that includes an event counter is indicative that starting from the time indicated by the event counter and until further changes to the extent, the content of logical addresses of the of extent are determined according to the requested extent change operation, even if the extent change operation has not been yet completed. An acknowledgment to the entity (for example—host computer coupled to the storage system) that requested the extent change operation can be sent immediately, before executing or completing the extent change operation.

The event counter can be indicative of the point in time of the request or can merely indicate an order of the extent change operation in relation to other events. Non-limiting examples of event counters can be timestamps, sequential numbers, version identifier and the like.

The events counted by the event counter (also referred to as monitored events) can be limited to extent change operations. Alternatively, the events counted by the event counter can also include events other than monitored events. For example, the creation of snapshots can also be counted by the event counter. If, for example, the same event counter is allocated for a source extent and a to a target extent then a snapshot of a source extent taken in response to a copy extent command for copying the content of a source extent to a target extent can be assigned with the same event counter value as the event counter value assigned to the copy extent command.

For simplicity of explanation it will be assumed that newer events are associated with higher event counter values.

Any data unit written in the storage system is tagged with a data unit write tag indicative of a value of the event counter when the data unit was written to the storage system. The data unit write tag can be stored in various manners. It can, for example, be included in the physical to logical mapping data structure and can be associated with a logical address of the data unit.

This data unit write tag and the event counters assigned to extent change operations enable to determine how to response to a request to read that data unit.

Assuming that the event counter increases over time then responding to a request to read a requested data unit of a requested logical address can include:
  a. Providing an expected content of the requested data unit if the value of its data unit write tag of the requested data unit is smaller than the value of the event counter of the last extent change operation associated with the requested data unit.
  b. Providing the currently stored content of the data unit if the value of the data unit write tag of the requested data unit is greater than or equal to the value of the event counter of the last extent change operation associated with the requested data unit.

Figure 1:
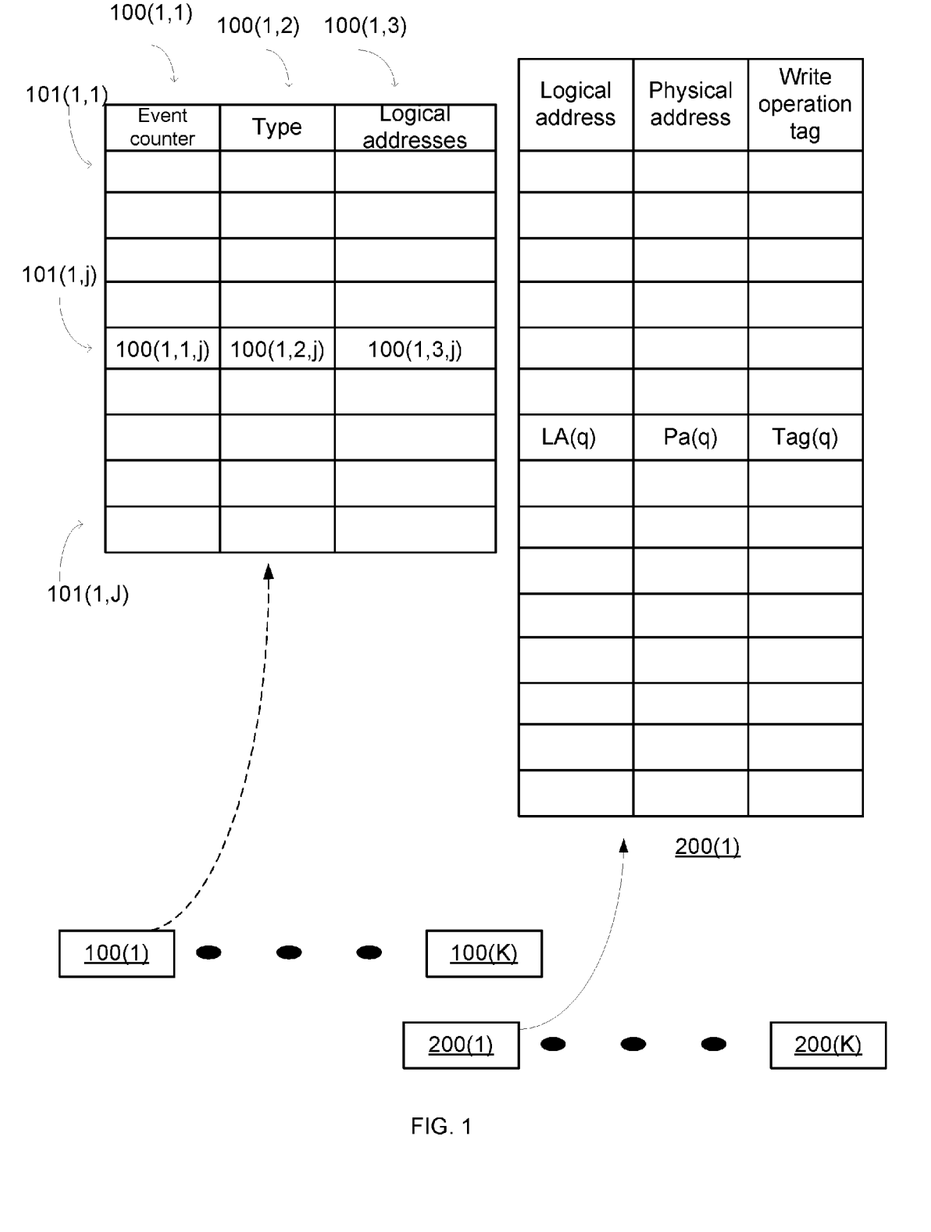
FIG. 1 illustrates data structures according to an embodiment of the invention.

FIG. 1 illustrates event data structures 100(1)-100(K) of multiple (K) logical volumes and logical to physical mapping data structures 200(1)-200(K) according to an embodiment of the invention.

It is assumed that the storage system supports K different logical volumes (first till K'th logical volume) and that an event data structure is provided for each logical volume. K being a positive integer.

FIG. 1 illustrates various details of the first event data structure 100(1) that is allocated for the first logical volume and includes information about events that affect (or that if executed will affect) the content of one or more data units addressed by logical addresses of the first logical volume.

In the following example different extent change information items are associated with different columns of the first event data structure and different monitored events are associated with different rows of the first event data structure. This arrangement is only an example and other arrangement of such information can be provided.

The first event data structure 100(1) includes, for each monitored event, extent change information that includes:
  a. Event counter (column 100(1,1)) indicative of a time of requested occurrence of the extent change operation.

This may be the time of reception of the request to perform the extent change operation.

b. Type of extent change operation indicator (column 100(1,2)) indicative of the type of the extent change operation (for example—Unmap or copy).

c. Logical addresses indicator (column 100(1,3)) indicative of logical addresses (one or more) associated with the extent change operation. The indicator may have one or more formats. For example—it can include the first and last logical addresses of a range of logical addresses to be affected. Yet for another example, it can include the first or last logical address and a size of the range. If the extent change operation is a copy extent operation (from a source extent to a target extent) then the logical addresses of the target extent and the logical addresses of the source addresses may be included in the logical address indicator. The logical addresses of the target extent can be searched when determining whether a logical address is associated with an extent copy operation.

The first event data structure 100(1) includes multiple (J) rows 101(1,1)-101(1,J)—an entry per each uncompleted monitored event associated with the first logical volume. J being a positive integer. Index j (mentioned below) ranges between 1 and J.

The j'th entry (101(1,j)) includes extent change information fields 100(1,1,j), 100(1,2,j) and 100(1,3,j):

Field 100(1,1,j) includes the event counter of the j'th extent change operation.

Field (1,2,j) includes the type of extent change operation indicator of the j'th extent change operation.

Field (1,3,j) includes the logical address indicator of the j'th extent change operation.

Information related to a monitored event can be deleted (or marked as invalid) from the first event data structure when the extent change operation is completed.

FIG. 1 also illustrates a first logical to physical mapping data structure 200(1) allocated to the first logical volume and is illustrated as including, for each data unit, a logical address field, a physical address field and a write operation tag. There are multiple (Q) data units that are currently stored in the storage system and associated with the first logical volume. The q'th data unit may be associated with logical address field 201(1,q), a physical address field 202(1,q) and a write operation tag 203(1,q). The logical address field 201(1,q) indicates the logical address of the data unit, the physical address field 201(1,q) is indicative of the physical address of the data unit (1, where it is stored in the storage system) and the write operation tag 203(1,q) is indicative of a value of the event counter when the data unit was written to the storage system.

It is noted that the logical to physical mapping data structure is usually more complex than first logical to physical mapping data structure 200(1). Though logical to physical mapping data structure 200(1) is illustrated as having an entry per each stored data unit, an entry can be associated with a contiguous range of several logical addresses. Though logical to physical mapping data structure 200(1) is illustrated as a table, other data structures may be used for mapping logical addresses into physical addresses, for example, a tree data structure. A non-limiting example of a highly sophisticated physical to logical mapping data structure is illustrated in U.S. patent application Ser. No. 13/008,197 of Satran et al titled "Mass Storage System and Method for Operating Thereof" which is incorporated herein by reference.

Figure 2:
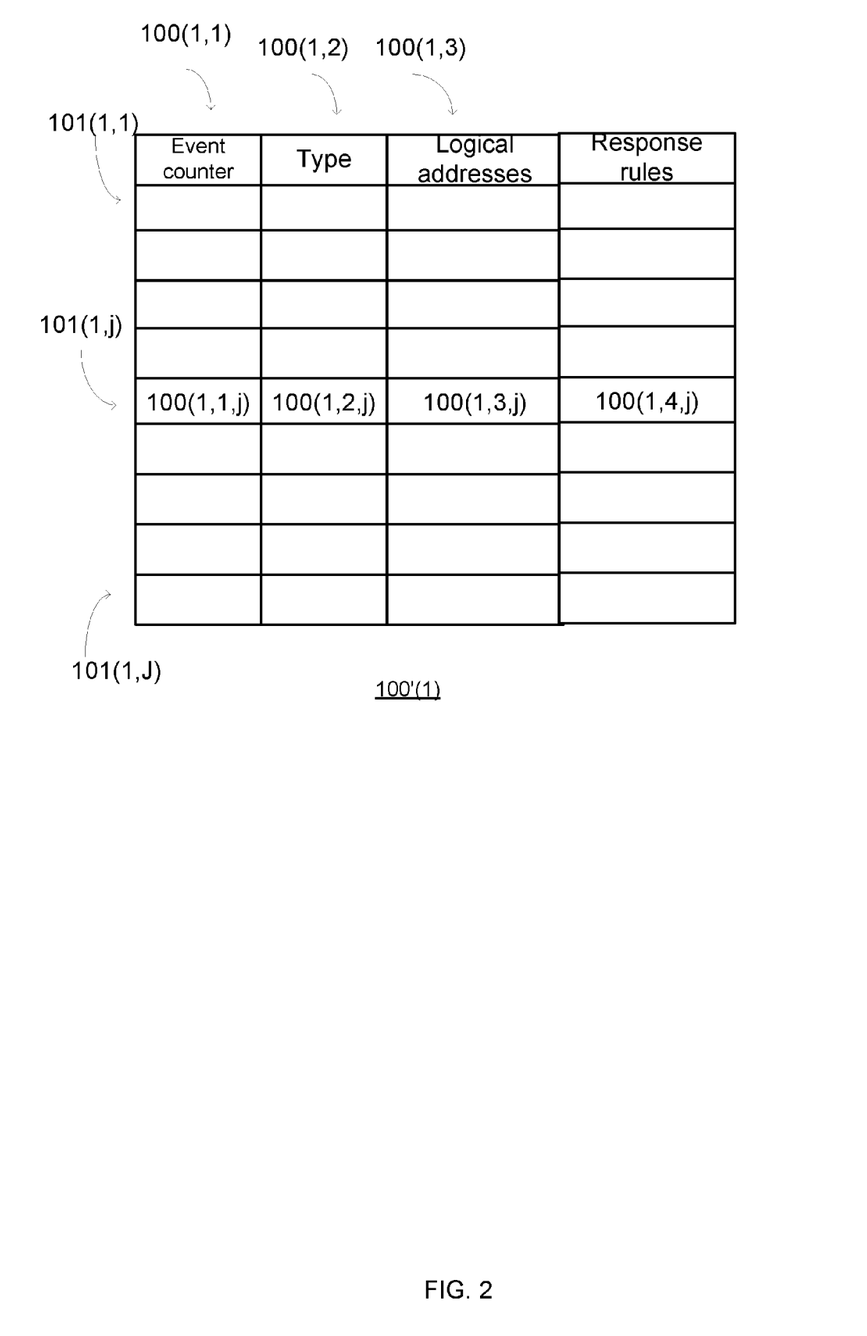
FIG. 2 illustrates data structures according to an embodiment of the invention.

FIG. 2 illustrates first event data structure 100'(1) of a first logical volume according to another embodiment of the invention.

First event data structure 100'(1) further includes information (response rule) about a manner for responding to a read request for a data unit having a requested logical address associated with an extent change operation. This information is included in column 100(1,4).

The j'th entry (101'(1,j)) includes extent change information fields 100(1,1,j), 100(1,2,j), 100(1,3,j) and 100'(1,4,j).

The 101'(1,4,j) field includes information about a manner for responding to a read request for a data unit having a logical address included in field 101(1,3,j).

Non-limiting examples of such rules can include:

a. If the extent change operation is an Unmap operation then respond by providing default content indicative of a deleted expected content. This default content may be a sequence of zeros.

If the extent change operation is a copy operation for copying a content of a source extent to a target extent then respond by creating a snapshot of the source extent in proximity to the read request point of time (either immediately or before any change to the source extent is made) and provide a content of a data unit of the snapshot, the data unit of the snapshot corresponds to a requested target data unit. The data unit of the snapshot corresponds in the sense that its content should be copied to the requested data unit. This stage may include re-directing the read request from the requested logical address to a logical address in the certain snapshot. Alternatively, the provision of the corresponding data unit of the snapshot can be executed by accessing an updated logical to physical address data structure of the certain context to map between logical addresses of the certain extent to physical addresses that store the certain snapshot.

Figure 3:
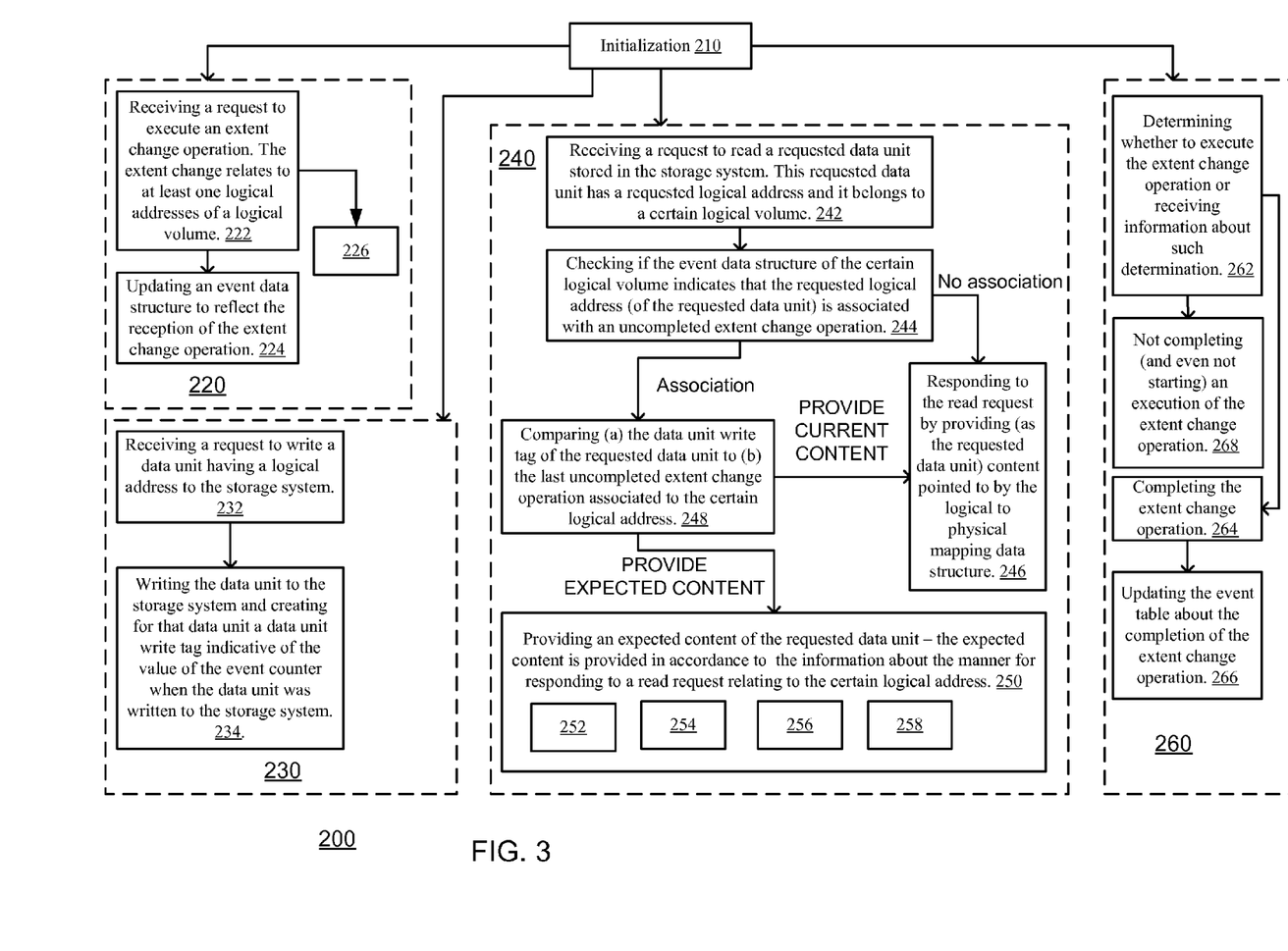
FIG. 3 illustrates a method according to an embodiment of the invention.

FIG. 3 illustrates method 200 according to an embodiment of the invention.

Method 200 includes an initialization stage 210 that is followed by multiple sequences of stages. The different sequences of stages may be executed in parallel to each other, in an overlapping or non-overlapping manner.

It is assumed that there is an event counter per logical volume, that the monitored events are extent change operations and that content change is requested (explicitly or implicitly) to occur once the extent change operations are received.

Initialization stage 210 may include setting the event counter of each logical volume to an initial value (e.g., 0).

The initialization stage 210 may include receiving or determining rules for responding to extent change operations.

a. For example—a response rule may determine to return a default value if the extent change operation is a un-map, the default value is indicative of non-exist content.

b. Yet for another example, a response rule may include creating a snapshot of a source extent identified by the extent change operation and providing a content of a data unit of the source extent as an expected content of a data unit.

Stage 210 may be followed by sequences 220, 230, 240 and 260.

Sequence 220 starts by stage 222 of receiving a request to execute an extent change operation. The extent change operation relates to at least one logical address of a logical volume. The request can be sent from a requesting entity. The requesting entity can be a part of the storage system or be outside of the storage system. It can be a hardware entity such as a host computer, a server, a computer that belongs to the storage system, a part of a control layer of the storage system. It can be a software entity such as a program, process thread executed by a computer such as the storage system controller.

Stage 222 is followed by stage 223 of updating an event data structure to reflect the reception of the extent change operation.

The event data structure is updated by including extent change operation information that includes:

a. An event counter indicative of a time of requested occurrence of the extent change operation—for example it may include the event counter value when the extent change operation was received.

b. A type of extent change operation indicator (Unmap, copy and the like).

c. One or more logical addresses associated with the extent change operation. These logical addresses include the addresses of an unmapped extent or logical addresses of a target extent. It may also include the logical addresses of the source extent.

d. The updating may include adding to the event data structure (iv) information about a manner for responding to a read request for data units having logical addresses associated with the extent change operation.

Stage 224 may be followed by stage 222 for receiving a next request for extent change operation.

Stage 222 may also be followed by stage 226 of taking a snapshot of a source extent if receiving a request to execute an extent change operation that is a copy extent operation from a writable source extent to a target extent.

Sequence 230 starts by stage 232 of receiving a request to write a data unit having a logical address to the storage system.

Stage 232 is followed by stage 234 of writing the data unit to the storage system and creating for that data unit a data unit write tag indicative of the value of the event counter when the data unit was written to the storage system. Stage 234 may include updating a logical to physical mapping data structure and assigning a physical address to the written data unit.

Stage 234 may be followed by stage 232 for receiving a next request for writing a data unit to the storage system.

Sequence 240 starts by stage 242 of receiving a request to read a requested data unit stored in the storage system. This requested data unit has a requested logical address and it belongs to a certain logical volume.

Stage 242 is followed by stage 244 of checking if the event data structure of the certain logical volume indicates that the requested logical address (of the requested data unit) is associated with an uncompleted extent change operation.

If the answer is "NO"—there is no such uncompleted extent change operation then stage 244 is followed by stage 246 of responding to the read request by providing (as the requested data unit) content pointed to by the logical to physical mapping data structure.

If the answer is "YES"—there is an uncompleted extent change operation associated with the requested logical address (of the requested data unit) then stage 244 is followed by stage 248 of comparing (a) the data unit write tag of the requested data unit to (b) the last (newest) uncompleted extent change operation associated to the requested logical address.

If the comparison indicates that the last uncompleted extent change operation associated to the requested logical address occurred after writing the data unit to the storage system then stage 248 is followed by stage 250 of providing an expected content of the requested data unit—the expected content is provided in accordance to the information about the manner for responding to a read request relating to the requested logical address.

Stage 250 may include:

a. If the extent change operation is an Unmap operation then responding by providing (252) default content indicative of a deleted expected content. This default content may be a sequence of zeros.

b. If the extent change operation is a copy operation for copying a content of a source extent to a target extent then responding (254) by creating a snapshot of the source extent in proximity (immediately or before any change to the source extent is made) to the read request point of time and providing a content of a data unit of the snapshot, the data unit of the snapshot corresponds to a requested target data unit. The data unit of the snapshot corresponds in the sense that its content should be copied to the requested data unit. In this case stage 252 may include (a) re-directing (256) the read request from the certain content to the certain snapshot or (b) accessing (258) an updated logical to physical address data structure that maps logical addresses of target extent to physical addresses of the snapshot of the source extent.

If the comparison indicates that the last uncompleted extent change operation associated with the requested logical address occurred before writing the data unit to the storage system then stage 248 is followed by stage 246. If data units were written to the requested logical address in multiple occasions the last writing operation should be taken into account.

When executing a read request, a provision of content (currently stored content or expected content) including providing the content to the entity that requested the content (for example—a host computer).

Other access requests can be received from host computers coupled to the storage system and may be translated into internal read requests (i.e., read requests initiated within the storage system). A copy request is an example of an access request that is translated in the storage system into an internal read (from the source) and internal write (to the destination). Another example is a read-modify-write request for overwriting a portion of a data unit and is translated into internal read and internal write. If, for example, the access request is a copy request then the provision of the content (currently stored content or expected content) includes copying the content to a storage system location pointed by a target logical address.

Accordingly, if the extent change operation that affect the data units involved in a copy-request is an Unmap operation then the providing (252) of a default content includes copying the default content to a location in the storage system pointed by a target logical address.

Yet for another example—providing the content of a data unit of the snapshot including copying that data unit to a location in the storage system pointed by a target logical address.

The read requests may also be initiated by internal processes within the storage system (e.g., rebuilding a volume, defragmentation of a volume) and the provisioning of the content in these cases is to the internal process that initiated the read request.

Method 200 was illustrated in a context of a request to read a single data unit. A data unit can be an atomic data unit or a non-atomic data unit. It can be of a fixed size or of a variable size. It can be, for example 64K bits long.

It is noted that requests for reading a range of logical addresses that include multiple data units (for example a request to read an extent) may be treated as multiple read requests, each read request aimed to a single data unit. Accordingly—method 200 may provide currently stored content s of some data units and expected contents of other data units of the requested range.

Sequence 260 may start by stage 262 of determining whether to execute the extent change operation or receiving information about such determination.

Stage 262 may be followed (according to the determination) by stage 264 of completing the extent change operation or by stage 268 of not completing (and even not starting) an execution of the extent change operation. Stage 264 may be followed by stage 266 of updating the event table about the completion of the extent change operation—for example by deleting any reference to that completed extent change operation.

A determination of whether to perform the extent change operation may be made according to preference of the user that initiated the extent-copy request, according to a system administrator decision, according to predetermined rules applied to certain logical volumes or the entire system, according to storage system load, size of the extent to be modified, and the like.

The following tables provide various examples of scenarios that can be managed according to method 200.

Table 1 provides an example of an event table of a k'th logical volume at a certain point of time. "LA" represents a logical address of a data unit, "PA" represents a physical address, "LAsource" represents a logical address of a data unit belonging to a source extent.

TABLE 1

| Event counter | Type of extent change operation | Logical addresses indicator | Response rules |
|---|---|---|---|
| 20 | Extent copy | Target addresses LA(1)-LA(10), LAsource(1)-LAsource(10) | If requested data unit is associated with a logical address out of LA(1)-LA(10) provide an appropriate content pointed by a corresponding logical address of LAsource(1)-LAsource(10) |
| 35 | Extent copy | LA(9)-LA(12), LAsource(19)-LAsource(22) | If requested data unit is associated with a logical address out of LA(9)-LA(12) provide an appropriate content pointed by a corresponding logical address of LAsource(19)-LAsource(22) |
| 100 | Unmap | LA(2)-LA(8) | Provide default value of deleted content |

Table 2 provides an example of logical to physical mapping data structure at a certain point of time:

TABLE 2

| Logical Address | Physical address | Data unit write tag |
|---|---|---|
| LA(1) | PH(1) | 19 |
| LA(2) | PH(2) | 101 |
| LA(3) | PH(3) | 10 |
| LA(4) | PH(4) | 14 |
| LA(5) | PH(5) | 15 |
| LA(6) | PH(6) | 16 |
| LA(7) | PH(7) | 16 |
| LA(8) | PH(8) | 150 |
| LA(9) | PH(9) | 30 |
| LA(10) | PH(10) | 30 |
| LA(11) | PH(11) | 30 |
| LA(12) | PH(12) | 110 |
| LA(13) | PH(13) | 110 |
| LA(14) | PH(14) | 110 |
| LA(15) | PH(15) | 110 |

Table 3 lists responses to read requests for reading data units of logical addresses LA(1)-LA(23) that are received after or at the certain point of time (after an event associated with event an event counter of value 150) then:

TABLE 3

| Logical address of requested data unit | Response | Explanations |
|---|---|---|
| LA(1) | Expected content = content of LAsource(1) | Data unit write tag of LA(1) (=19) < event counter (=20) of first extent copy command |
| LA(2) | Currently stored content = content of PH(2) | Data tag unit of LA(2) (=101) > event counter (=100) of Unmap command |
| LA(3)-LA(8) | For LA(3)-LA(7): Expected content = default value (Unmap operation) | Data tag unit of each one of LA(3)-LA(7) < event counter (=100) of Unmap command |
| | For LA(8): Currently stored content = content of PH(8) | Data tag unit of LA(8) (=150) > event counter (=100) of Unmap command |
| LA(9)-LA(11) | Expected content = content of LAsource(19)-LAsource(21) | Data unit write tag of each one of LA(9)-LA(11) (=30) < event counter (=35) of second extent copy command |
| LA(12) | Currently stored content = content of PH(12) | Data unit write tag of each LA(12) (=110) > event counter (=35) of second extent copy command |
| LA(13)-LA(15) | Currently stored content = content of PH(13)-PH(15) | Event table does not include entries related to these logical addresses. |

Figure 4:
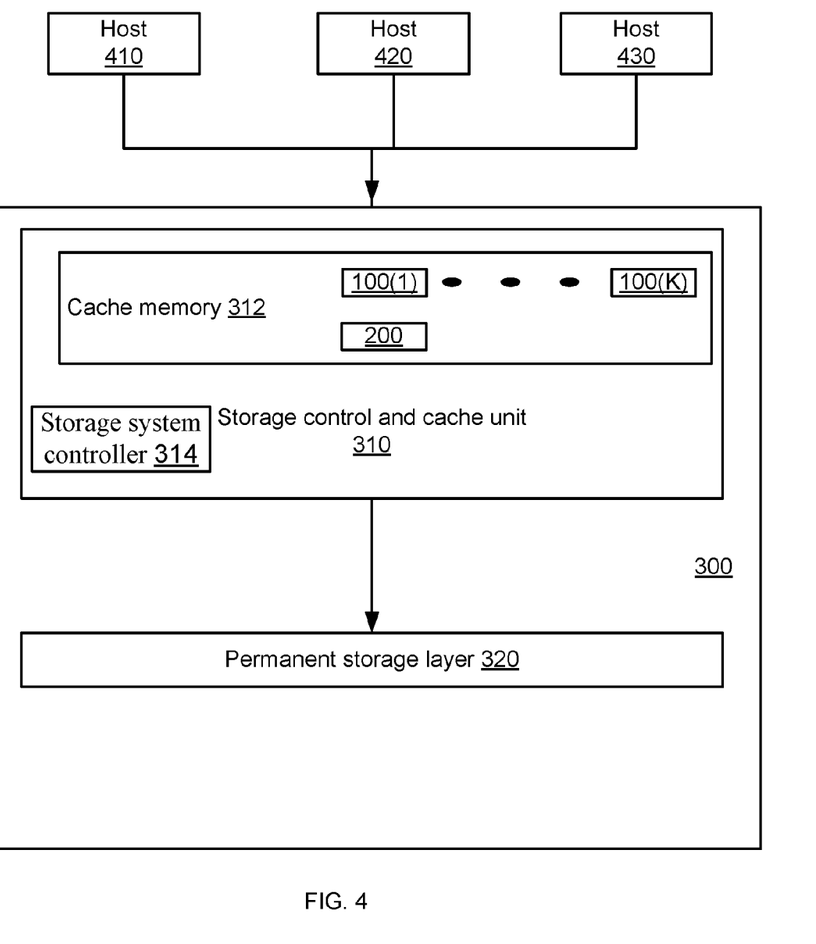
FIG. 4 illustrates a storage system and its environment according to an embodiment of the invention.

FIG. 4 illustrates a storage system 300 and its environment according to an embodiment of the invention.

The storage system 300 includes a storage control and cache layer 310 and a permanent storage layer 320. The storage control and cache layer 310 includes a cache memory 312 and a storage system controller 314. The cache memory 312 may be used to cache data units received from host computers (such as host computers 410, 420 and 430) before de-staging these data units to the permanent storage layer 320. The control and cache layer 310 may store various data structures such as logical to physical mapping data structure 200 and event data structures 100(1)-100(K). Some or all of these data structures may also be stored in the permanent storage layer 320. The permanent storage layer 320 may include multiple disks, solid state drives and the like.

The storage system 300 may execute method 200.

Figure 5:
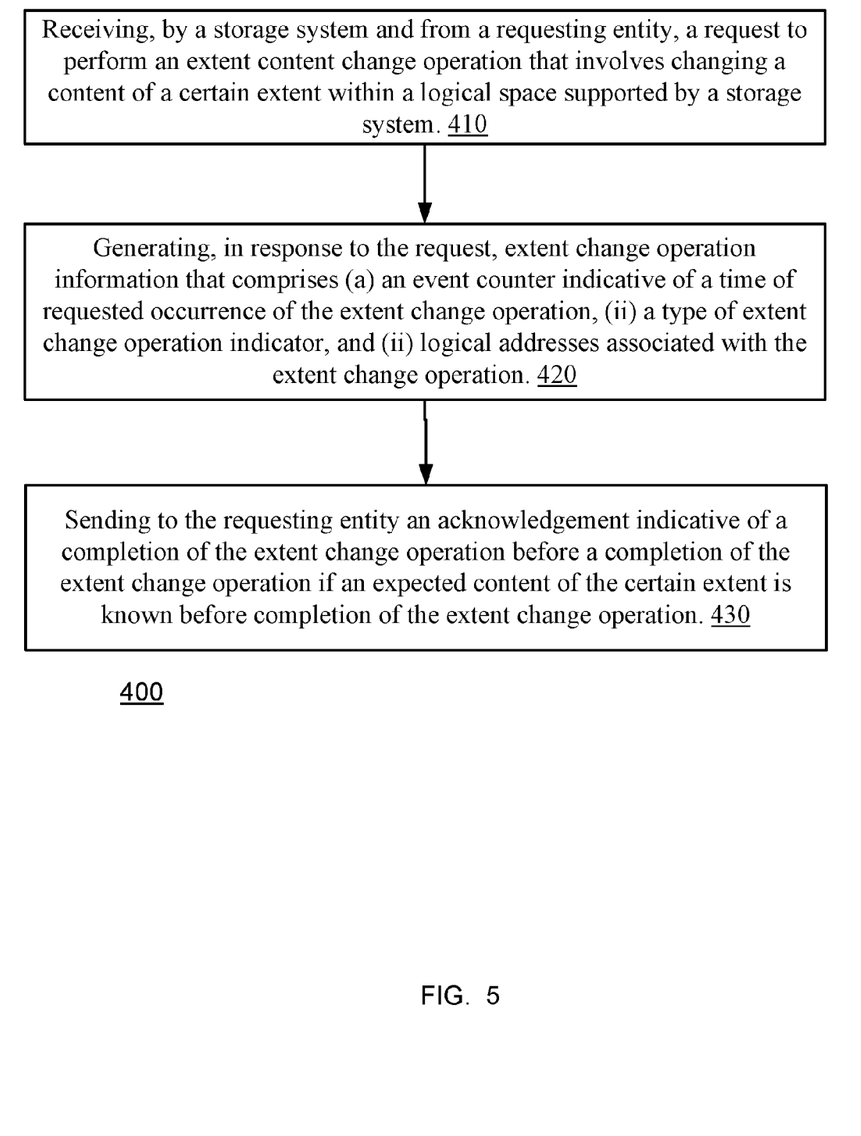
FIG. 5 illustrates a method according to an embodiment of the invention.

FIG. 6 illustrates method 400 according to an embodiment of the invention.

Method 400 starts by stage 410 of receiving, by a storage system and from a requesting entity, a request to perform an extent content change operation that involves changing a content of a certain extent within a logical space supported by a storage system.

Stage 410 may be followed by stage 420 of generating, in response to the request, extent change operation information that comprises (a) an event counter indicative of a time of requested occurrence of the extent change operation, (ii) a type of extent change operation indicator, and (ii) logical addresses associated with the extent change operation.

Stage 420 may be followed by stage 430 of sending to the requesting entity an acknowledgement indicative of a completion of the extent change operation before a completion of the extent change operation if an expected content of the certain extent is known before completion of the extent change operation.

Stage 420 may include completing the exchange operation as a background process.

Stage 430 may include sending the acknowledgement immediately after generating the extent change operation information.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention.

We claim:

1. A method for responding to an extent change operation, the method comprising:
   receiving, by a storage system and from a requesting entity, a request to perform an extent content change operation that involves changing a content of a certain extent within a logical space supported by a storage system;
   generating, in response to the request, extent change operation information that comprises (a) an event counter indicative of a time of requested occurrence of the extent change operation, (ii) a type of extent change operation indicator, and (ii) logical addresses associated with the extent change operation; and
   sending to the requesting entity an acknowledgement indicative of a completion of the extent change operation before a completion of the extent change operation if an expected content of the certain extent is known before completion of the extent change operation.

2. The method according to claim 1, comprising completing the exchange operation as a background process.

3. The method according to claim 1, comprising sending the acknowledgement immediately after generating the extent change operation information.

4. A method for accessing data units in a storage system, the method comprises:
   receiving by a storage system, at an access request point of time, an access request for accessing a requested data unit having a requested logical address;
   determining, by the storage system, whether to respond to the access request by providing either one of:
   (a) a currently stored content of the requested data unit; and
   (b) an expected content of the requested data unit at a completion of an extent change operation that is not completed at the access request point of time, wherein the extent change operation involves changing a content of a certain extent that comprises the requested data unit;

providing the expected content if it is determined to provide the expected content; and providing the currently stored content if it is determined to provide the currently stored content.

5. The method according to claim 4 comprising determining to provide the expected content if a last extent change operation associated with the requested data unit was requested to be executed at a point of time that exceeded writing the requested data unit to the storage system.

6. The method according to claim 4 wherein the access request is a read request.

7. The method according to claim 4 further comprising completing the extent change operation.

8. The method according to claim 4 comprising providing the expected content regardless of a completion of the extent change operation.

9. The method according to claim 4 wherein the extent change operation is an Unmap operation and wherein the providing of the expected content comprising providing a default content indicative of a deleted content.

10. The method according to claim 4 wherein the extent change operation is a copy operation for copying a content of a source extent to the certain extent.

11. The method according to claim 10 wherein the source extent is a read only extent and wherein the method comprises re-directing the access request from the requested logical address to a logical address in the source extent.

12. The method according to claim 11 comprising updating a logical to physical address data structure that includes mapping of the certain extent to map between logical addresses of the certain extent to physical addresses that store the source extent.

13. The method according to claim 10 wherein the method comprises creating a certain snapshot of the source extent in proximity to the read request point of time.

14. The method according to claim 13 wherein the providing of the expected content comprises providing a content of a data unit of the certain snapshot that corresponds to the requested data unit.

15. The method according to claim 13 wherein the providing of the expected content comprises re-directing the access request from the requested logical address to a logical address in the certain snapshot.

16. The method according to claim 13 comprising updating a logical to physical address data structure that includes mapping of the certain extent to map between logical addresses of the certain extent to physical addresses that facilitate a retrieval of the certain snapshot.

17. The method according to claim 4 comprising maintaining, per each logical space entity that is supported by the storage system, extent change operations information that comprises, for each extent change operation that is associated with at least one logical address of the logical space entity, (a) an event counter indicative of a time of requested occurrence of the extent change operation, (ii) a type of extent change operation indicator, and (ii) logical addresses associated with the extent change operation.

18. The method according to claim 17, wherein the extent change operation information further comprises information about a manner for responding to a read request for data units having logical addresses associated with the extent change operation.

19. The method according to claim 17, comprising maintaining for each data unit currently stored by the storage system a data unit write tag indicative of a value of the event counter when the data unit was written to the storage system.

20. The method according to claim 19, wherein the determining comprises determining to provide the expected content if a value of a data unit write tag of the requested data unit and an event counter associated with a last extent change operation associated with the requested data unit indicate that the last extent change operation associated with the requested data unit was requested to be executed at a point of time that exceeded writing the requested data unit to the storage system.

21. The method according to claim 19, wherein the determining comprises determining to provide the currently stored content if a value of a data unit write tag of the requested data unit and an event counter associated with a last extent change operation associated with the requested data unit indicate that the last extent change operation associated with the requested data unit was requested to be executed at a point of time that preceded writing the requested data unit to the storage system.

22. The method according to claim 21, comprising maintaining a logical to physical mapping data structure that includes mapping information about data units written to the storage system, wherein the logical to physical mapping is calculated regardless of any extent change operation; wherein the providing of the currently stored content comprises utilizing the logical to physical mapping data structure.

23. The method according to claim 22, wherein the logical space entity is a volume.

24. A non-transitory computer readable medium that stores instructions that one executed by a computer cause the computer to execute at least the stages of: receiving by a storage system, at a read request point of time, a read request for reading a requested data unit having a requested logical address; determining, by the storage system, whether to respond to the read request by providing either one of: (a) a currently stored content of the requested data unit; and (b) an expected content of the requested data unit at a completion of an extent change operation that is not completed at the read request point of time, wherein the extent change operation involves changing a content of a certain extent that comprises the requested data unit; providing the expected content if it is determined to provide the expected content; and providing the currently stored content if it is determined to provide the currently stored content.

25. A storage system that comprises a permanent storage layer and a storage control and cache unit, wherein the storage control and cache unit is arranged to:

receive at a read request point of time, a read request for reading a requested data unit having a requested logical address;

determine whether to respond to the read request by providing either one of: (a) a currently stored content of the requested data unit; and (b) an expected content of the requested data unit at a completion of an extent change operation that is not completed at the read request point of time, wherein the extent change operation involves changing a content of a certain extent that may include the requested data unit;

provide the expected content if it is determined to provide the expected content; and provide the currently stored content if it is determined to provide the currently stored content.

* * * * *